Oct. 21, 1930. O. M. BULLOCK Re. 17,837

CULTIVATOR

Original Filed April 18, 1922

Inventor
ORIN M. BULLOCK

By Harry C. Schroeder
Attorney

Reissued Oct. 21, 1930 Re. 17,837

UNITED STATES PATENT OFFICE

ORIN M. BULLOCK, OF OAKLAND, CALIFORNIA

CULTIVATOR

Original No. 1,657,064, dated January 24, 1928, Serial No. 554,766, filed April 18, 1922, and renewed July 13, 1927. Application for reissue filed October 19, 1929. Serial No. 401,019.

My invention relates to an improvement in cultivators and more particularly to a rotary cultivator having resiliently acting blades which are sprung out of the ground with a shovel action whereby the soil is thoroughly broken and finely cultivated.

The device of my invention comprises a body which is adapted to be rolled over the ground and which by its own weight, or an additional force having a downward component, drives or forces blades into the soil against an energy storing medium: and on continued rolling of the body the stored energy is used to actuate the blades to loosen, turn, lift or otherwise cultivate the soil. The blades are mounted on a suitable body, which may be rolled, and connected thereto to project in advance of the body, contact with the soil in advance thereof, by the weight of the body be forced into the soil, and at the same time cause a storage of energy which, on the further rolling of the body is released to pull the blades through the soil and give them a lifting action to the rear of the body, the blades being substantially at rest in relation to the soil when directly underneath the main part of the rolling body.

One embodiment of my invention which I have successfully used is an appliance comprising a reel or drum having arms mounted thereon for carrying ground engaging blades which are related to the drum through an energy storing means in such a way that energy is stored as the blades are forced into the ground by the advancing or rolling drum and in such a way that the energy is subsequently released to expel the blades from the ground forcibly and concomitantly break up the soil. The drum is advanced with a simple, rolling motion in the manner of a wheel and without any additional rotary movement. My device is thus not to be confused with cultivators which have resilient or resiliently mounted blades on reels or drums that are positively rotated, dragging the blades through the soil, whether these are pulled along the ground and rotate in the direction of travel, the reverse thereto or crosswise.

Figure 1:
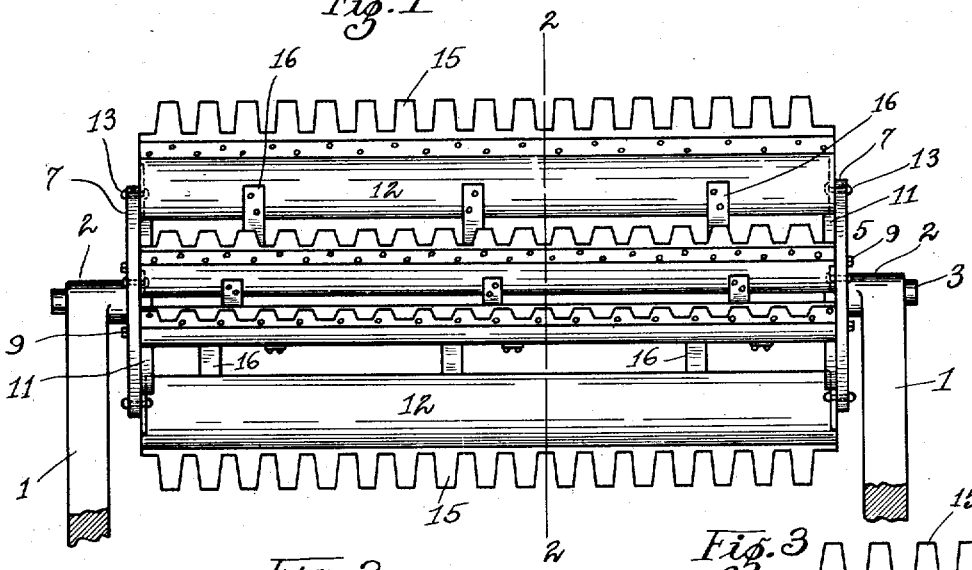
Fig. 1 is a plan view of my cultivator with the front portion of the frame thereof broken away.
Figure 2:
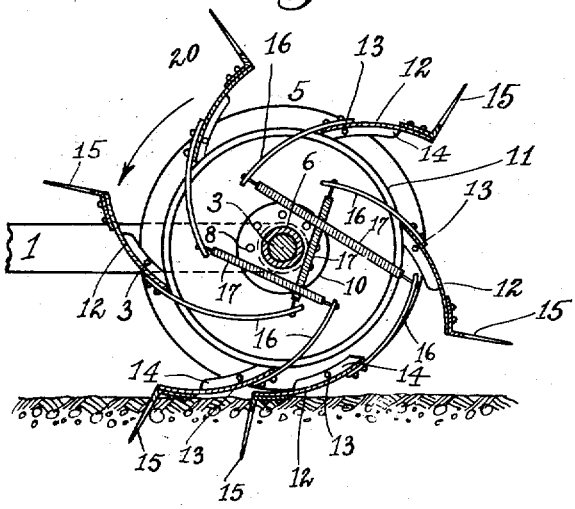
Fig. 2 is a transverse vertical section of my cultivator taken on line 2—2 of Fig. 1.
Figure 3:
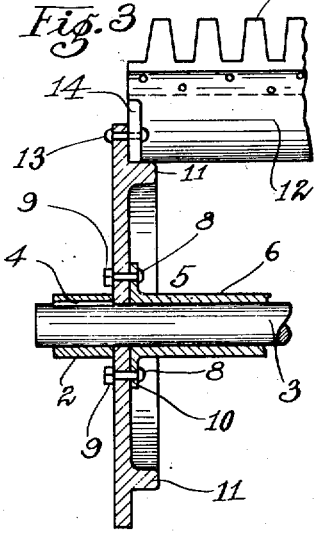
Fig. 3 is a fragmentary longitudinal section through one end of my cultivator.

In the drawing 1 indicates a frame on the rear end of which are sleeves 2—2 in which are keyed the ends of a transverse shaft 3 by means of keys 4. On the shaft 3 between the bearings 2—2 is journaled a reel 5 comprising a sleeve 6 surrounding said shaft and disk heads 7—7 secured to the ends of said sleeve by bolts 8 and nuts 9, which bolts extend through annular flanges 10—10 on the ends of said sleeve and through said heads. The heads 7—7 are formed in their inner sides near their peripheries with annular flanges 11—11. Arcuate blade levers 12, preferably six in number are pivoted at their ends outside the flanges 11—11 with their convex sides outward to the inside of the heads 7—7 by pivots 13—13 which extend through said heads near their peripheries and through inturned flanges 14—14 on the ends of said levers, the inner ends of said levers and flanges 14—14 being adapted to engage the flanges 11—11 to limit the outward movement of the levers. Comb-toothed blades 15 are secured to the outer ends of the levers 12 respectively, said blades extending outwardly and radially from said levers. Inwardly extending arms 16 preferably three in number are secured to the inner edge of each blade lever 12 at suitable distances apart. Springs 17 respectively connect the arms 16 of each blade lever 12 to the corresponding arms 16 of another blade lever, which springs normally tend to hold the levers and their blades 15 in their outermost position, but yield to allow the blades and levers to swing inwardly when they engage the ground as shown in Figure 2.

As the reel 5 rolls in the direction of arrow 20 (Fig. 2), the blades 15 engaging the soil swing inwardly on their pivots and expand their springs 17 so that as the reel continues to roll and begins to withdraw said blades from the soil said springs contract and throw said blades outwardly at the rear out of the soil with a shovel action, thus thoroughly digging and breaking up the soil and finely cultivating the same. It will be evident that in the operation of the machine, energy is stored in each spring whenever one of the lever arms to which it is attached passes under the reel, that the blades are substantially stationary in the soil directly under the shaft 3 and that it is practically only the released energy of the spring which turns or cultivates the soil.

It will be obvious that my appliance may be varied considerably to suit special circumstances, that it could be attached to tractor wheels, the track of a track-laying tractor or made with stiff springs so that the reel would not touch the ground.

In some of the claims the designation "resilient means or springs operatively connecting the arms and the body" is used. It will be observed that each of the arms 16 by the spring, the pivotal connection of the opposite arm and the stop is operatively connected from the arm to the body. A spring from each arm could be connected directly to the body or reel, but this would necessitate double the number of springs.

It is to be understood that I do not limit myself to the form of the cultivator shown and described herein, as the invention, as set forth in the following claims may be embodied in a plurality of forms.

I claim:

1. In an agricultural implement, a frame, a reel journaled on said frame, a plurality of blade levers pivotally mounted on the reel, said levers on the portion outside the reel being curved substantially similar to the periphery of the reel, blades secured on the outer end of said levers, arms extending from the inner edges of the levers, and springs connecting the arms of each lever with corresponding arms of another lever for normally holding said levers and their blades swung outwardly, from said reel.

2. In an agricultural implement, a frame, a reel journaled on said frame, a plurality of blade levers pivotally mounted on said reel, blades secured on the outer ends of said levers, arms extending from the inner edges of said levers, and springs connecting the arms of each lever with corresponding arms of another lever for normally holding said levers and their blades swung outwardly from said reel.

3. In an agricultural implement, a frame, a reel journaled on said frame, annular flanges on the inside of the heads of said reel, levers pivoted to said heads, blades on the outer ends of said levers, and springs for normally holding said levers and their blades swung outwardly from said reel, the inner edges of said levers engaging said flanges to limit their outward movement.

4. In an agricultural implement, a frame, a revolvable member journaled on said frame, a plurality of levers mounted on said revolvable member, blades on said levers, and a single yielding means for normally holding a plurality of said levers and their blades swung outwardly from the revolvable member.

5. A cultivator comprising a reel adapted to roll over the ground, a pair of arcuate levers pivoted to said reel, a tension spring connecting the inner ends of said levers, and a radial blade carried by each of said levers.

6. A cultivator comprising a rotatable member, arcuate levers pivotally mounted on said member, blades secured to the outer ends of said levers, arms secured to the inner ends of said levers, and means engaging said arms for normally urging said levers outwardly from said rotatable member.

7. A cultivator comprising a rotatable member, a plurality of arcuate levers pivotally mounted on said member, blades secured to the outer ends of said levers, arms secured to the inner ends of said levers, and springs connected to said arms for normally urging said levers outwardly from said rotatable member.

8. A cultivator comprising a rotatable member adapted to be rolled over the ground, a plurality of arcuate plates resiliently mounted on said member, and ground engaging blades on said plates.

9. A cultivator adapted to advance in a predetermined direction comprising a rotatable member adapted, during said advance, to be rolled over the ground about an axis transverse to said direction, a plate resiliently mounted on said member, a blade on said plate, said plate and blade being adapted to contact with the ground in advance of said member and to remain stationary for an appreciable period, said blade being adapted to be forced into the ground upon the rolling of said member, and means for normally urging said plate outwardly from said member, said means being adapted to force said blade out of the ground upon continued rolling of said member.

10. A cultivator adapted to advance in a predetermined direction comprising a rotatable member adapted, during said advance, to be rolled over the ground about an axis transverse to said direction, a plate resiliently mounted on said member, a blade on said plate; said plate and blade being adapted to contact with the ground in advance of said member and to remain stationary for an appreciable period, said blade being forced into the ground upon the rolling of said member and being forced out of the ground upon the continued rolling of said member.

In testimony whereof, I have hereunto set my hand.

ORIN M. BULLOCK.